Figure 4:
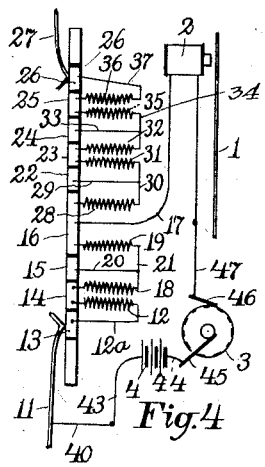

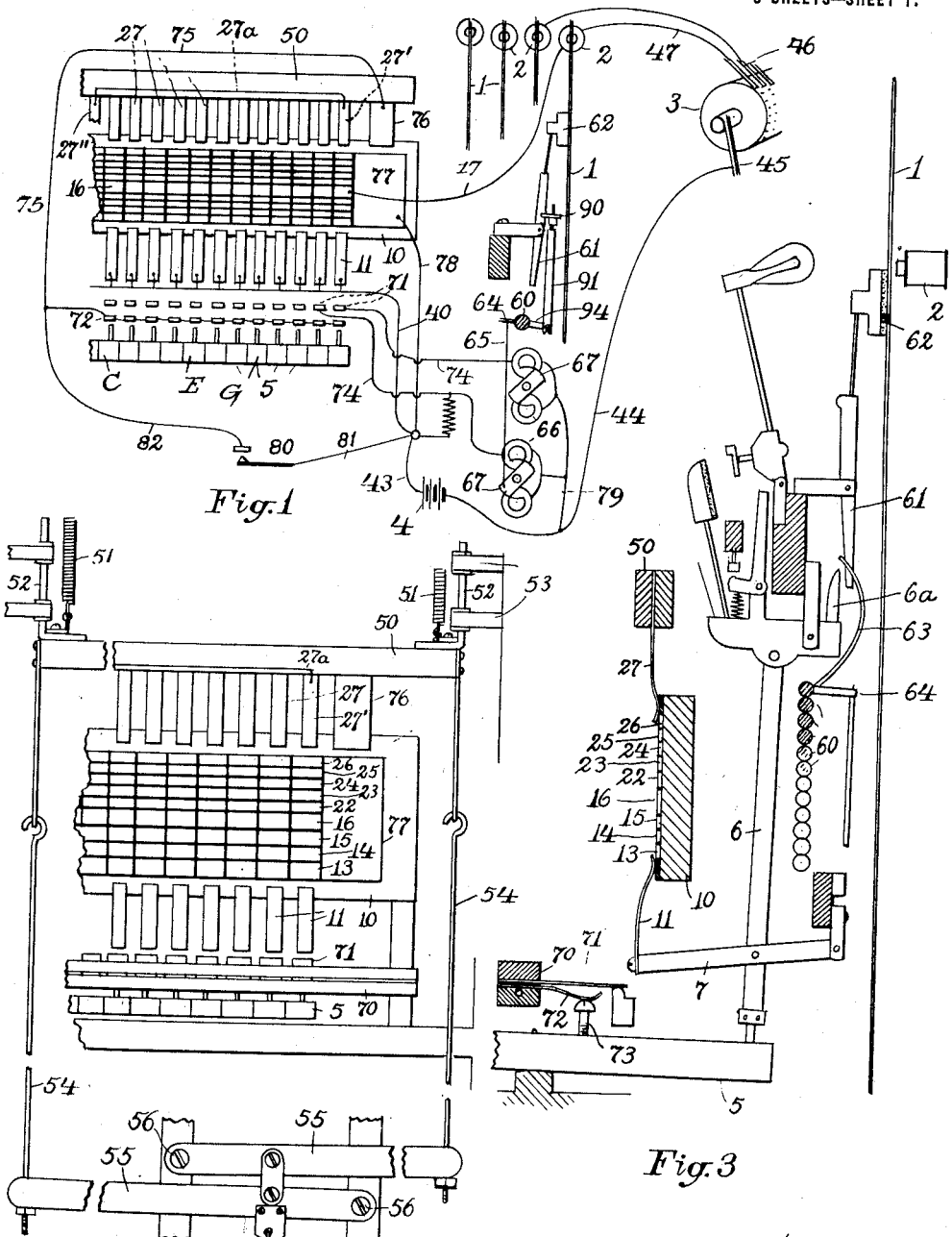

M. L. SEVERY & G. B. SINCLAIR.
COUPLER FOR MUSICAL INSTRUMENTS.
APPLICATION FILED MAR. 31, 1913.

1,255,651.

Patented Feb. 5, 1918.
5 SHEETS—SHEET 2.

Witnesses,

Inventors,
Melvin L. Severy,
George B. Sinclair;
By
Attorney.

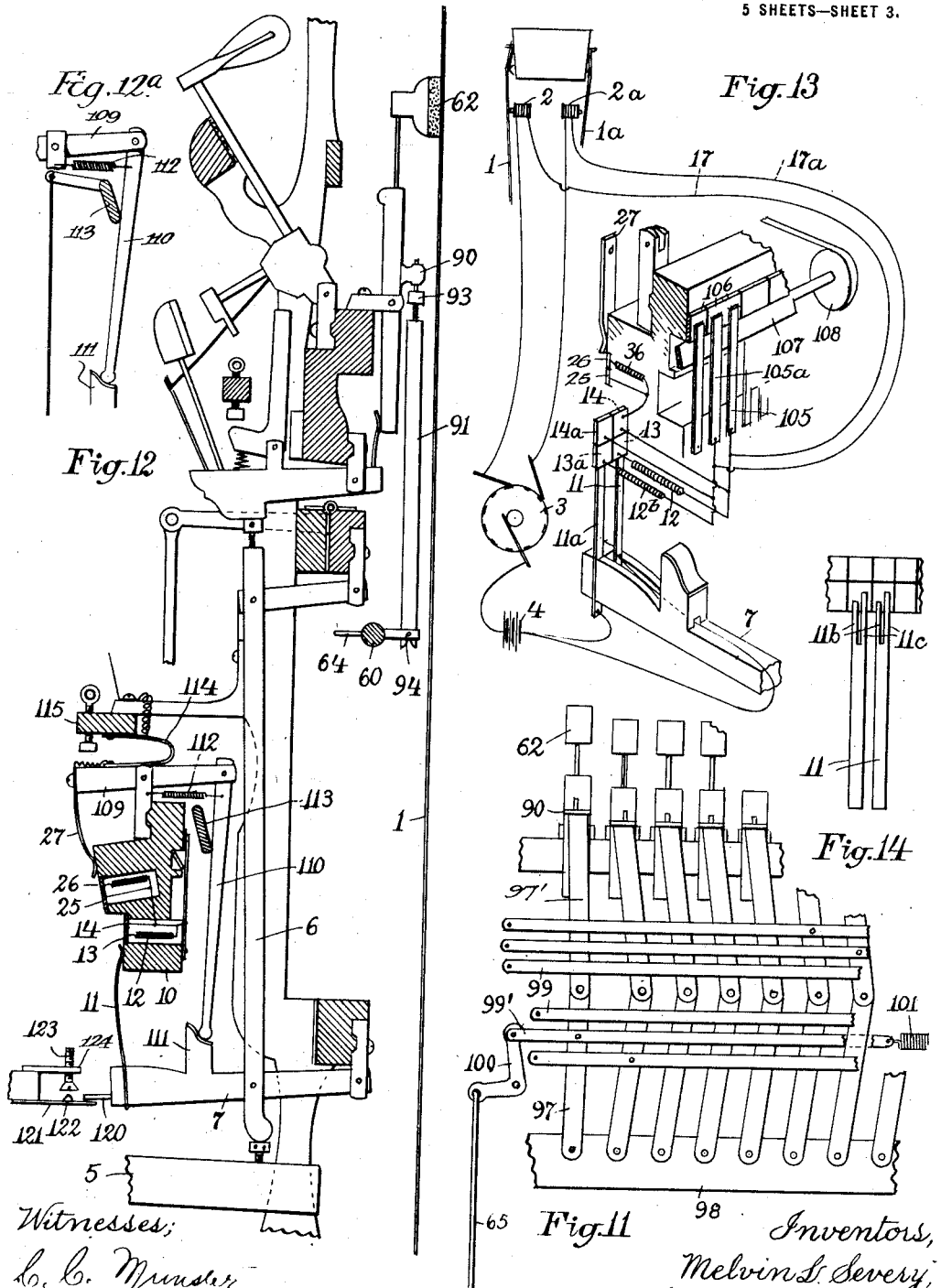

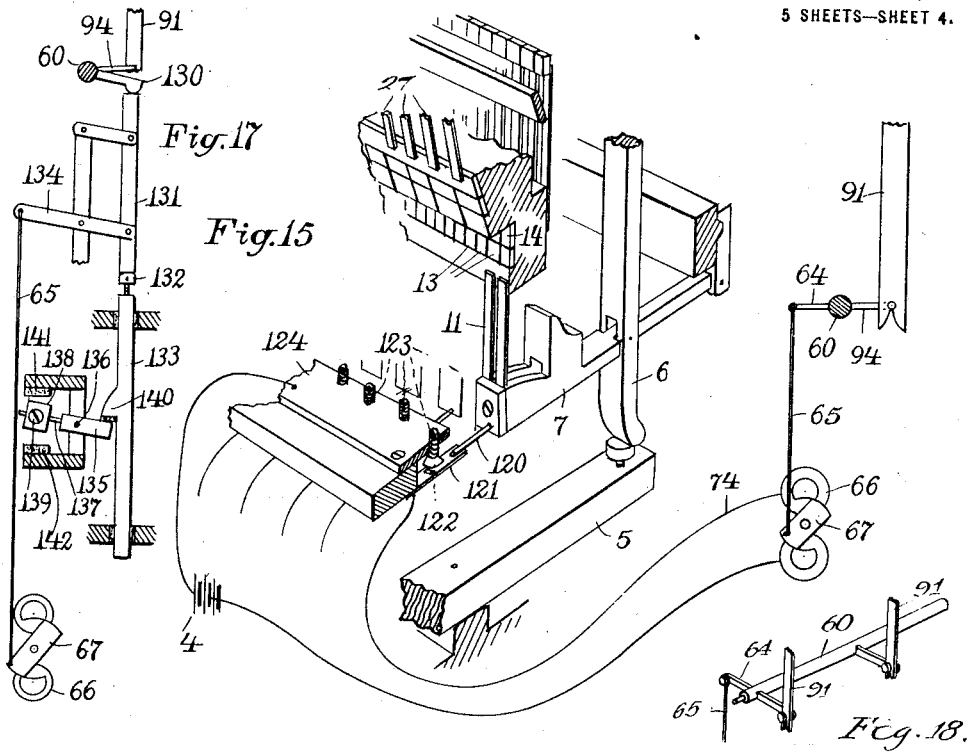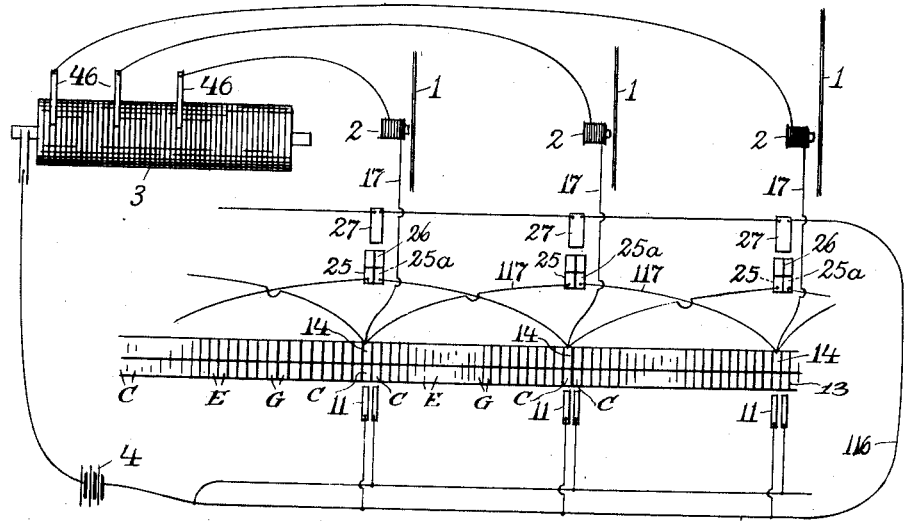

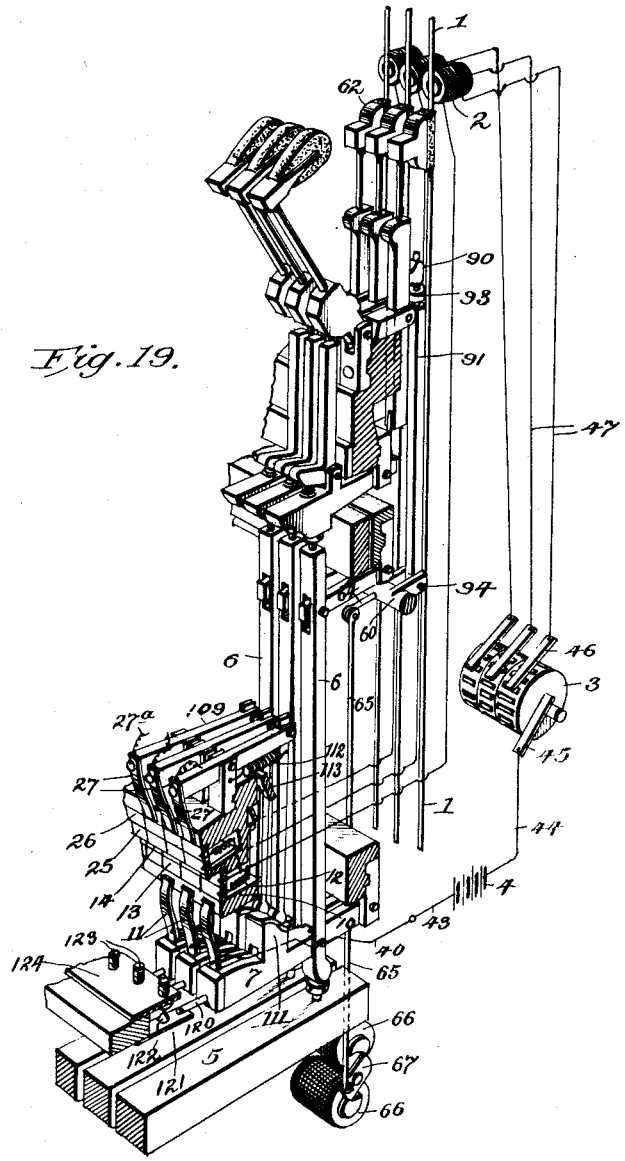

UNITED STATES PATENT OFFICE.

MELVIN L. SEVERY, OF ARLINGTON HEIGHTS, MASSACHUSETTS, AND GEORGE B. SINCLAIR, OF GEORGETOWN, MAINE.

COUPLER FOR MUSICAL INSTRUMENTS.

1,255,651.  Specification of Letters Patent.  Patented Feb. 5, 1918.

Application filed March 31, 1913. Serial No. 757,872.

*To all whom it may concern:*

Be it known that we, MELVIN L. SEVERY, of Arlington Heights, in the county of Middlesex and Commonwealth of Massachusetts, and GEORGE B. SINCLAIR, of Georgetown, in the county of Sagadahoc and State of Maine, both citizens of the United States, have invented certain new and useful Improvements in Couplers for Musical Instruments, of which the following is a full, clear, and exact description.

This invention pertains primarily to the type of electric musical instruments wherein magnetically attractive strings are vibrated by means of electromagnets having suitably timed electric pulsations delivered thereto, as set forth in our companion application Serial No. 273,199, (issued Sept. 12, 1916, as Patent No. 1,198,070); although the same can be used in connection with other forms of electrically operated stringed instruments, and certain features, with pianos of the usual type.

It is obvious that this instrument lends itself most readily to mechanical manipulation by means of traveling perforated music rolls, and the like, as found in the mechanical players at present on the market most of which operate to press the keys of the ordinary keyboard. Any means, however, of opening and closing the appropriate electrical circuits, whether through the operation of the keys of the keyboard or otherwise, would come well within the scope of our invention, and whenever, therefore, we herein refer to "keys" we wish to be understood to include within that term any mechanism operating to produce the results for which said keys are designed, as it is manifest that the various circuits of this instrument could be opened and closed mechanically, either with or without the use of a keyboard. We do not, therefore, limit ourselves either in this specification or the claims, to an instrument operated only by the usual pressure of the keys of a keyboard, but desire to include any means by which this instrument may be operated by a mechanical or human player.

Among the objects of this invention are, first, the construction of a simplified electrically operated note coupler for instruments of the kind above set forth, as well as for instruments of other types; second, the construction of means for varying the loudness or volume of the coupled notes; third, the production of a damping device wherein the dampers will be automatically withdrawn from all strings of like note name when any one thereof is vibrated, either with or without the simultaneous operation of said coupler; and other details of construction hereinafter set forth.

Figure 5:
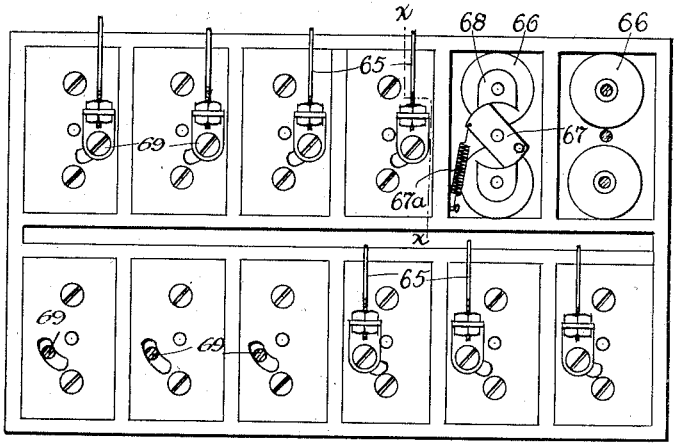
Figure 6:
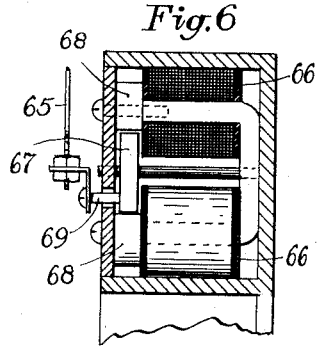
Figure 7:
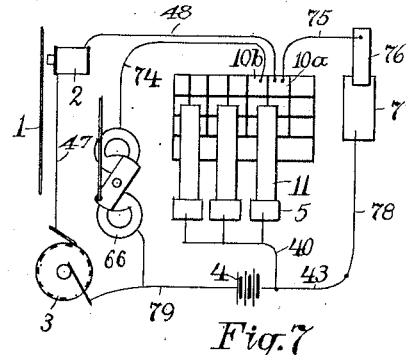
Figure 8:
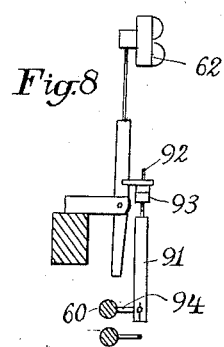
Figure 10:
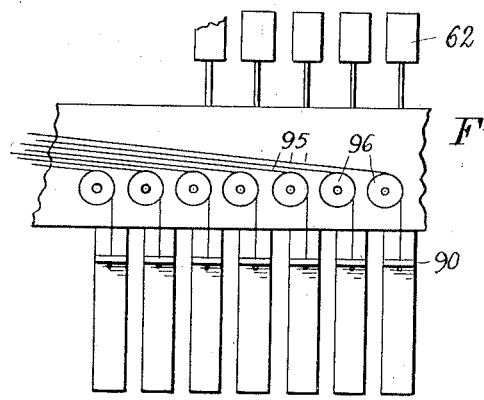
Figure 9:
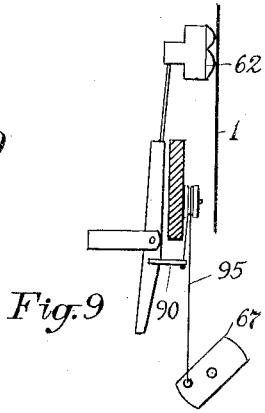

Referring to the drawings forming part of this specification, Figure 1 is a diagram of a musical instrument made in accordance with our invention. Fig. 2 is a front elevation on a larger scale of our note coupler and key action, showing the graded resistance rail. Fig. 3 is a side sectional elevation of the same, together with the hammer action. Fig. 4 is a transverse sectional view, mainly in diagram, of the graded resistance rail or rheostat board, and connections. Fig. 5 is a front elevation, partially in section, of the damper controlling magnets. Fig. 6 is a sectional view of one of said magnets on the line X—X in Fig. 5. Fig. 7 is a diagram illustrating a modified means for delivering current to the damper operating magnets. Fig. 8 is a side sectional elevation of one form of device by means of which said magnets control the dampers. Fig. 9 is a similar view of another form of said device. Fig. 10 is a partial face view of the latter. Fig. 11 is a face view of still another form of means for the same purpose. Fig. 12 is a side sectional elevation of the preferred form of our piano action, showing our note coupler, and other improved features connected therewith. Fig. 12ª is a fragmentary perspective view illustrating the manner of mounting and actuating the bar by which the note-coupler is thrown out of action. Fig. 13 is a perspective view, partly in diagram and section, showing the wiring of our action rail and note coupler designed for our double instrument. Fig. 14 is a detail view of our circuit-closing brushes. Fig. 15 is a perspective view, partly in diagram and section, illustrating our preferred form of circuit-closing means for the damper-controlling electromagnets. Fig. 16 is a diagram showing an illustrative wiring of our note coupler. Fig. 17 is an elevation of our damper-fall shock absorber. Fig. 18 is a fragmentary perspective view of the damper-coupler rock shaft.

Fig. 19 is a perspective view of the parts shown in Fig. 12, showing also the electromagnets and the pulsation-producing device.

In said drawings and in the following description, we set forth our invention as specifically adapted for coupling octaves, but it is evidently equally applicable for coupling notes of any desired musical interval. The instrument to which our invention is applicable is substantially that disclosed in our companion application above referred to; the main differences relating to the arrangements of the action rail, rheostats and auxiliary damper-control; the actuating electromagnets, make-and-break devices, and keys being substantially the same.

We set forth several modifications of our invention in this application, and will begin with the description of that illustrated in Figs. 1 to 4. In all the figures, the reference numeral "1" designates one of the sonorous bodies, preferably one string or a group of two or three strings tuned in unison in the usual manner. Each such string or group of strings is vibrated by means of an electromagnet "2", to which properly timed electric pulsations are delivered by a make-and-break device "3" receiving current from a suitable source "4"; keys "5" being provided for closing the circuits to the electromagnets whose strings are to be sounded.

Such keys are arranged in the usual keyboard to electrically vibrate as well as to percussively actuate their strings, this last function being performed by means of the usual type of piano action, as shown in detail in Fig. 3, the depression of a key at its outer end forcibly elevating the vertical sticker "6" which operates the hammer connected therewith. Each such sticker has a lever extension "7" projecting forward beneath the rail or rheostat board "10", upon whose face are contacts engaged by the brushes "11" carried by said extension levers. Simultaneously, therefore, with the depression of any keys, their brushes "11" are caused to traverse said contacts vertically, and such contacts being arranged to successively cut out resistance as the brushes rise, the actuating pulsations delivered to the electromagnets "2" connected therewith are made to correspondingly increase in strength.

As shown in Figs. 3 and 4, in vertical section, and in Figs. 1 and 2 in face view, there are several horizontal rows of such contacts and as many vertical rows as there are keys. Each vertical row of contacts is in electrical connection through resistances and wires as shown in Fig. 4, a resistance 12 and a wire 12ª joining the lowermost contact 13 with the contact 14 next above; the contact 14 is joined to the one 15 next above it by a resistance 18, and wires 20, 21; while the contact 15 is connected with the uppermost contact 16 of this group by wires 21, 20 and resistance 19; the contact 16 being connected by a wire 17 to the electromagnet 2.

Immediately above these contacts is a similar group comprising contacts 22, 23, 24, 25 and 26 swept by brushes 27, composing the principal elements of our note coupler. The contacts in each vertical row are connected, in much the same manner as the contacts above described, to the contact 16 and hence to the electromagnet associated therewith. Such connections consist of the resistances 28, 31, 32, 35, and 36, and the wires 29, 30, 33, 34 and 37. Hence, as a brush 27 descends from contact to contact, said resistances are cut out one by one until the central contact 16 is reached.

It is evident that the number of these horizontal rows of contact-blocks may be increased or diminished, but the number illustrated is ample for producing all the gradations in volume which the ear is ordinarily capable of appreciating. In fact, for most of our instruments we prefer to considerably reduce such number, making two serve the purpose as shown in our preferred construction in Figs. 12 to 16 inclusive. While two contacts for each brush are practically sufficient for sonorous gradation, it is ample for preventing the sparking which would otherwise occur when the brushes open and close the circuits, as will be more fully described hereinafter.

Referring again to our construction set forth in Figs. 1 to 4, and particularly to Figs. 1, 2 and 3, it will be seen that said brushes 27 are carried by a movable bar 50 normally drawn upward by coiled springs 51; guided by arms or rods 52 slidable in fixed ways 53; the means for depressing said bar consisting of links 54 joining its ends to the levers 55, which are pivotally supported at 56 and operated by a suitable pedal 58.

Said brushes 27 are each wired to one or more other brushes 27 which traverse contacts in a circuit to electromagnets bearing some predetermined musical relationship to an electromagnet of the first brush. Such relationship we prefer to be that of octaves, so that, as shown in Fig. 1, each brush is wired to the thirteenth brush to either or both sides therefrom. As illustrated, the brush 27' is connected by a wire 27ª to the brush 27''. If desired, the brush 27'' can be similarly connected with another brush twelve below it, and so on down. We prefer, however, to join each brush to but two brushes, one an octave above, and the other an octave below, as shown more clearly in Fig. 16.

Whenever, now, a brush 11 is elevated into touch with its contact-block 16, and the bar 50 is depressed to present its brushes to the row of contacts 16, energizing pulsations will be delivered through said brush 11 to its associated electromagnet 2, and in addition the same pulsations will be delivered through the brush 27 in alinement with the brush 11, through the coupling wires 27$^a$ to the brushes 27 bearing octave relationship therewith, and thence through the contacts 16 and their wires 17, to the associated electromagnets of strings in octaves with the one just described. This signifies that in addition to the string associated with the key depressed, there will be two or more other strings vibrated simultaneously therewith.

If the brushes 27 are but partially depressed, while a key-brush 11 is in touch with a contact-block 16, then the coupled strings will vibrate less loudly than the original one.

When a brush 11 is in touch with its contact-block 16, the circuit to its associated electromagnet comprises, as shown in Figs. 1 and 4, the wires 43, 40, brush 11, contact-block 16, wire 17, electromagnet 2, wire 47, brush 46, toothed disk 3, brush 45, and wire 44 back to the current source 4.

Inasmuch as the dampers 62 are usually withdrawn from engagement with the strings by the push of the spoons 6$^a$ against the tails 61 of the dampers when the strings are percussively actuated, and inasmuch as the actions of the strings are not moved when they are vibrated through the medium of the octave coupler, it is necessary to provide other means for withdrawing the dampers from the strings. To do this, we provide a number of electromagnets 66, shown in Figs. 1, 5 and 6, each controlling the dampers of strings of like note name,—as all or several of the C strings, for instance,— and so arrange the circuit-closing contacts of the action rail that every time a key is depressed the magnet which controls the damper of the string associated with said key and the dampers of strings in octave relation therewith, will receive energizing current causing it to remove such dampers from their strings, and to hold them removed so long as said key remains depressed.

Since there are twelve notes in an octave, twelve electromagnets are provided, each magnet controlling as many dampers as there are damped octaves which it is desired to thus couple.

Each said electromagnet 66 is arranged as shown in Figs. 5 and 6; being of horseshoe type, and provided with an armature 67 rotatively supported between the pole-pieces 68, and elastically held in its normal position by a tension spring 67$^a$, as shown in Fig. 5. From a pin or screw 69 projecting from said armature, a link 65 runs to the arm 64 of a rockshaft 60, the motion of each of which rockshafts is designed to remove the dampers from all or part of the strings of like note name, as the C-strings, D-strings, etc. Consequently, when one of the electromagnets 66 is energized through the depression of a certain key, as B or C, the selected number of B-strings or C-strings will have their dampers also removed therefrom.

In the construction illustrated in Fig. 3, each rockshaft 60 is provided with fingers 63 engaging the damper-tails 61 of selected dampers, but our preferred construction is that shown in Figs. 1 and 12, as will be more fully described hereinafter.

To cause the proper electromagnet 66 to be thus energized upon depression of a key 5, each said magnet 66 is connected by a wire 79 with the current-source 4, and the current passes from such magnet by a wire 74, contacts 71 and 72, wire 75, brush 76, contact 77, and wires 78 and 43 back to the source 4. The contacts 71 and 72 are insulated from each other, and their free ends are normally out of touch, as shown in Fig. 3, but the contact 72 lies immediately below the contact 71, and directly over a pin or screw 73 projecting upward from a key 5. When such key is depressed and its inner end rises, said contact 72 is pressed upward and caused to bear against contact 71, thereby completing the circuit of the electromagnet 66 controlled by said contacts 71 and 72.

When the instrument is played only percussively and it is still desired to use this note-coupler, the switch 80 is closed, and the current for each electromagnet 66 will then flow as follows: from one pole of the source 4 by wire 79 to the proper electromagnet 66, thence by wire 74 to the contact 71 of the depressed key 5, to contact 72, thence by wire 82, switch 80, wires 81 and 43, back to the source of current 4. This arrangement can be applied to an ordinary non-electrically operated piano.

Ordinarily it is desired to have said circuits thus closed only when the note coupler is in use, but we have also so arranged the same that the damper-coupler may be used independently of the note coupler, as hereinafter set forth. To this end we provide the bar 50 with a brush 76, and the rheostat board 10 with a large contact block 77; said brush being joined by wire 75 to the leaf contacts 72, and said block connected by wires 78, 43 to the plus pole of the current-source 4. When, therefore, the bar 50 is in its normal elevated position, the circuits to the electromagnets 66 are all open, but are closed as soon as the said bar and consequently the brush 76, have been appreciably depressed.

It is evident that this last described arrangement can be applied to a piano not provided with the electric actuating mechanism above described. In fact, we have discovered that very beautiful effects are produced in this manner, owing to the sympathetic vibrations from the positively vibrated strings, set up in the strings thus relieved of their dampers.

Although we show twelve electromagnets 66, one for each note of an octave, it is evident that such number may be indefinitely increased if desired, even to the extent of providing a separate magnet for every damper; but our described method is much simpler and far preferable in every way.

It is apparent that our coupler can be applied to automatic instruments, either without the usual key manual, or so arranged that this manual should be inoperative when the instrument is automatically played; for which reason, when we refer to a key or its action, we wish to be understood to mean that which initiates a tone, and to include all which, in automatic instruments, takes the place of the ordinary key in the key-manual type of instrument.

Instead of providing the key 5 with the contacts 71 and 72, the same result may be attained by the arrangement illustrated in Fig. 7, where the contact blocks over which the brushes 11 move are represented as divided into two parts, designated 10$^a$ and 10$^b$, and said brushes are shown of a width to span or bridge the open space or insulation separating the two sections. From the section 10$^a$ a wire 48 proceeds to the magnet 2, which is in circuit with the rotary make-and-break device 3 and current source 4, as before described. The second conductor 74 proceeds from the section 10$^b$ to the coils of the magnet 66 and thence to the wire 79 which connects with the current source 4, the brush 11 being connected with the opposite side or pole thereof by the wire or conductor 40. Whenever, therefore, a brush 11 makes contact with the two sections 10$^a$ and 10$^b$ of any line of contact members 13, 14 or 15, the magnet 66 in circuit with said contacts will be energized and caused to withdraw the damper of the associated sonorous body.

The arrangement shown in Figs. 1 and 8 for transmitting the action of the electromagnets 66 to the dampers, consists of the rock-shafts 60 having each an arm or elbow 64 joined by a link 65 to the armature 67 associated therewith, and a series of arms 94 equal in number to the octaves to be coupled. From each said arm 94 rises a connection 91 to the thumb 90 rigid with a damper 62. Adjustment is permitted by the nuts 93 turning on the threaded pins 92.

Figs. 9 and 10 show another device for the same purpose, where the pull of each armature 67 is transmitted through a fine cord or thread 95 over suitable pulleys, such as 96, to the thumb 90.

In the construction shown in Fig. 11, each thumb 90 is engaged by a toggle joint 97, 97' supported at the lower end by a suitable fixed rail 98, and operated by the link 99, through the medium of an elbow lever 100 or its equivalent, connected by a link 65 to the magnet armature 67, as before explained. Each link 99 is pin-jointed to one member of each of the several toggles 97 associated with the dampers to be coupled, so that upon the turning of the armature 67 all the toggles so connected will be simultaneously straightened or broken. A spring 101 is shown in Fig. 11 to move the connecting links 99 in a direction opposed to the pull of the armature 67, thus serving to break the connected toggles, and to permit the dampers to bear upon the strings or sonorous bodies with which they are associated. It will be seen, however, that if the springs 67$^a$ represented in Fig. 5, be made sufficiently strong, the spring 101 will be unnecessary. Each link 99 is pinned to the toggle joints whose associated strings are of like note name. For example, one link will be connected to all the C-strings.

In the preferred form of our action designed for use in our double instruments, such as those set forth in our applications Serial No. 537,257 and Serial No. 745,400 (issued respectively as Patent No. 1,181,486, dated May 2, 1916, and as Patent No. 1,196,401, dated August 29, 1916), and which is shown in full in Fig. 12, we employ but two rows of contact blocks for the engagement of the brushes 11, instead of the several shown in Figs. 1 to 4. In place of the single brush 11 rising from each lever extension 7, we provide in our multiple instruments two, 11 and 11$^a$, as shown in Fig. 13. Each brush is given two contact blocks, the brush 11 traversing the contacts 13, 14 and the brush 11$^a$ traversing the contacts 13$^a$, 14$^a$. The upper contacts 14, 14$^a$ are connected to the wires 17, 17$^a$ without intermediate resistance, but the lower contacts are connected through resistances 12 and 12$^b$ to said wires. The wire 17 runs to an electromagnet 2 of the front instrument, and 17$^a$ to the electromagnet 2$^a$ of the back instrument. Consequently, unless other switches are introduced into the circuits, whenever a key 5 is depressed, pulsatory currents will be delivered to the proper electromagnets of both the front and rear strings 1, 1$^a$ simultaneously.

Above each pair of brushes 11, 11$^a$, is a single brush 27 of the note coupler adapted to traverse two contacts 26, 25 which are wired to the contact 14,—the contact 26 through a resistance. When the note coupler brushes are depressed into touch with either row of contacts 25 or 26, and a pair of brushes 11, 11ª elevated into touch with either row of their contacts, with the construction thus far described, the coupled pulsations will be delivered to the front electromagnets alone. To render the instrument capable of delivering at the will of the operator such coupled pulsations to either the front instrument alone, or to both instruments simultaneously, we provide the leaf contacts or springs 105, 105ª suitably supported at their lower ends and connected thereat with the respective wires 17, 17ª. The upper ends of these leaf contacts resiliently press against the contacts or bridging blocks 106; each pair 105 and 105ª, against a single block 106.

Said contact blocks being conductors, each thereof acts as a bridge to put such pair of leaf contacts in electric connection, and the coupled pulsations delivered to the front electromagnet, will pass from the wire 17 up the brush 105 to said block 106, then down the brush 105ª to the wire 17ª and thence to the back electromagnet 2ª.

To cut out such coupled pulsations from the back magnets, the bar 107 is located just back of the brushes 105, 105ª and provided with suitable means for its partial rotation, as the wheel and strap 108. When this bar 107 is in a vertical position, said brushes 105, 105ª remain in touch with said blocks 106, but when turned to near a horizontal position, said bar presses said brushes out of touch with said blocks, and, being itself a nonconductor, the above described communication with the rear electromagnets is broken.

To prevent sparking when a brush, as 11 or 27, is moved across the insulation separating two contact blocks, we form it with two unequal prongs as 11ᵇ, and 11ᶜ, shown in Fig. 14, which inequality is sufficient to permit one of said prongs to have crossed the insulation and to be in touch with one block before the other prong has left the other block.

Instead of simultaneously shifting all the coupler brushes 27, as by the bar 50 shown in Figs. 1, 2 and 3, we mount each said brush in our preferred construction at the end of an intermediately pivoted lever 109 (see Fig. 12) from the opposite end of which a strut 110 descends into the seat or saddle 111 rising from a lever extension 7. Whenever the latter rises under the action of a depressed key 5, the associated brush 27 descends into touch with its contact blocks.

A tension spring 112 normally holds the strut in said seat, but such struts may be pressed out and away from their said seats by means of the bar 113 as it is turned from a vertical to an angular position, and the coupling devices thrown thereby out of action. The manner of mounting and actuating said bar 113 is indicated in Fig. 12ª, where an arm or lever is shown applied to one of the journals at the upper side of the bar. This arm or lever will be connected by a rod or wire with a pedal, knee-swell, or the like, in any usual way for its convenient actuation.

The wiring of this note coupler is quite different from that previously described, the brushes 27 being all in parallel circuits preferably through the slender metallic strips 114 fastened both to the levers 109 and to the fixed rail 115; the lower end of such said strip being electrically connected with its brush 27, and the upper ends of said strips with a common circuit.

Such wiring is more fully illustrated in Fig. 16, where 116 represents the common wire thus connected with the brushes 27. The contact blocks 25 are not, however, wired to the contact blocks 14 directly beneath, as set forth in connection with Figs. 1 to 4, but each block 25ª is wired to a block 14 an octave above, and each block 25 to another an octave below. Consequently, when a brush 27 is depressed simultaneously with the elevation of a brush 11, as for example the middle of the three different ones illustrated in Fig. 16, the current will not only flow from the source 4 through the middle make-and-break brush 46, the middle electromagnet 2, wire 17, and middle brush 11 back to said source, but through the other two make-and-break brushes 46, the outer two electromagnets 2, wires 17 to the outer contacts 14, and thence through the wires 117 to the middle contacts 25, 25ª, brush 27 and common wire 116 back to the source. In this manner, the note coupler causes three different strings to be vibrated simultaneously, the same being either octaves of each other or bearing some other desired musical relationship.

For convenience of designation or of reference, the strings of the front instrument collectively are referred to as one "set," and the strings of the rear instrument are similarly referred to collectively as another "set." The double instrument, or that illustrated in Fig. 13, hence comprises a plurality of sets of sonorous bodies. The phrase "a plurality of sets of sonorous bodies," as used in the claims, hence has the meaning thus indicated and none other.

In place of the arrangement shown in Figs. 1 and 3 for completing the circuits to the damper-controlling electromagnets 66, and which consists of the parts 71, 72, 73, etc., we prefer that shown in Figs. 12 and 15. Here each lever extension 7 is provided with a projecting pin 120 normally resting upon a resilient leaf contact 121 and thereby keeping its contact-point 122 out of touch with the adjustable contact 123 supported by the metal plate 124 fixed above the same.

Upon the elevation of a lever extension 7, the contact point 122 of the leaf contact previously held down thereby, rises into touch with its associated adjustable contact 123 and completes the circuit with the electromagnet 66 which controls the dampers of the strings bearing the predetermined relationship above recited. This arrangement is simpler and more easily adjusted than that first above described. By properly adjusting the screw 123 of this last described contact device, or the screw 73 of the contact device illustrated in Fig. 3, completion of the circuit of magnet 66 can be made to take place in advance of the closing of the circuit of the magnets 2 which effect vibration of the sonorous bodies, or in advance of the blow of the hammer, if the hammer actuation be employed. This is important in order that the damper or dampers controlled by such magnet 66 be withdrawn before the vibration of the string or sonorous body begins, and that the vibration be entirely free. The adjusting screws 73 and 123 further enable the operator to make such adjustment as shall preclude the closing of the circuit of the electromagnet 66. Thus if the screw 73 be turned sufficiently far into the key 5, said key will be arrested by the stop above it before the contact arm 72 is pressed against the contact 71. Similarly, if the screw 123 be adjusted to such distance from the contact 122 that they shall not be brought together by actuation of the key, or deflection of the arm 121, the circuits of magnets 66 will remain open.

When the dampers are electrically operated, there is a noticeable jar when the operating devices return to their normal positions. To obviate this, a shock-absorber is provided therefor. This is constructed as shown in Fig. 17.

Each group of associated dampers 62 is connected to the arms 94 of their common rock-shaft 60, each said rock-shaft having a lever-arm 130 projecting therefrom which rests upon a longitudinally movable post 131. In its turn, said post is supported by the capstan 132 rising from the plunger 133. The lower end of said plunger is held by the intermediately pivoted lever 134 whose opposite end is connected by a link 65 to the armature 67 of the electromagnet 66 above described. When said armature turns, said lever is canted and the connected dampers 62 removed from their strings, while the demagnetization of said electromagnet permits said parts to suddenly fall and cause the slight shock just complained of.

The shock-absorber consists of the levers 135, one for each plunger 133, pivotally supported at 136 and provided with a wire extension 137 upon which is a weight 138 adjustably held thereon by a set screw 139. The plunger 133 being formed with a shoulder 140 suitably felted, when the latter strikes the end of said lever 135 at nearly the termination of the drop of such plunger and connected parts, said weight 138 is given a quick upward throw which absorbs practically all the momentum of said parts and so brings them to rest without shock to the instrument.

Felt cushions 141, 142 are provided for deadening the blows of said weights 138 at each extreme of their swings. In Fig. 17, the weighted lever is illustrated as in the act of being thrown upward by the impact of the plunger.

What we claim as our invention and for which we desire Letters Patent is as follows, to wit:—

1. In combination with a series of sonorous bodies and with key-controlled means for vibrating the same; dampers for said bodies; means for withdrawing said dampers from the sonorous bodies with which they are respectively associated; and means controlled by a single key, connected with and serving to withdraw the dampers from a plurality of other sonorous bodies in predetermined musical relation to the body actuated by said key.

2. In combination with a series of sonorous bodies and with key-controlled means for vibrating the same; dampers for said bodies; means for withdrawing said dampers from the sonorous bodies with which they are respectively associated; and means controlled by a single key, connected with and serving to withdraw the dampers from a plurality of other sonorous bodies in predetermined musical relation to the body actuated by said key, such other bodies being respectively of higher and of lower pitch than the body immediately associated with the actuated key.

3. In combination with a series of sonorous bodies, dampers for said bodies; a coupler connecting the dampers of a plurality of said bodies bearing predetermined musical relation; an actuating device for said coupler, whereby it is caused to retract the coupled dampers; electromagnetic means for effecting vibration of the undamped bodies; and keys controlling the means for effecting vibration of the sonorous bodies and also controlling the damper-actuator, whereby the depression of a single key is caused to undamp several sonorous bodies and to bring them into vibration.

4. In combination with a series of tuned sonorous bodies; means for effecting vibration thereof; dampers for said bodies; a coupler for connecting the dampers of bodies bearing predetermined musical relation; and an electromagnetic actuator for moving said damper coupler and thereby effecting simultaneous withdrawal of the dampers of such related bodies.

5. In combination with a series of tuned sonorous bodies, means for their actuation; a coupler for connecting the actuating means of certain bodies bearing predetermined musical relation; dampers for the several bodies; and electrical means directly acting upon the dampers of the bodies whose actuating means are coupled, to simultaneously withdraw the damper of any selected sonorous body of the series and of the sonorous bodies whose actuating means are so coupled.

6. In a musical instrument, the combination of a series of tuned sonorous bodies; electrical means for independently vibrating said bodies; keys controlling said electrical means; an electrical resistance in circuit with the electrical vibration-producing means of each sonorous body; electrical contacts, one for each key, movable relatively to, and adapted to cut out, such resistance proportionately to the depression of the key, thereby controlling the loudness of the tone of the body which said key controls; a coupler for coupling with the electrical vibration-producing means of the sonorous body controlled by the actuated key, the electrical vibration-producing means of a body or bodies bearing predetermined musical relation thereto; and a variable resistance included in the coupling circuit of each electrical vibration-producing means so coupled, and adapted to vary the resistance and thereby to vary the loudness of sound of the coupled bodies in proportion to the extent of movement of the coupler.

7. In combination with a series of tuned sonorous bodies, key-controlled electrical means for causing vibration thereof; a coupler adapted to cause a body or bodies additional to that immediately associated with a depressed key to be vibrated through the actuation of such single controlling key; and a rheostat located intermediate the coupler and the coupled vibration-producing means for varying the loudness of the tone produced by such additional bodies without affecting that of the body immediately associated with such depressed key.

8. In combination with a series of sonorous bodies; key-controlled means for electrically actuating the same; a coupler for connecting the electrical actuating means of a plurality of said bodies with a single controlling key, whereby at will the depression of such single key may be made to actuate other sonorous bodies in such series bearing predetermined musical relation to the body whose key is depressed; dampers for the sonorous bodies; means for automatically withdrawing the dampers from the bodies whose actuating means are coupled; and means for varying the loudness of tone produced by the added bodies independently of the body whose key is pressed.

9. In combination with a series of tuned sonorous bodies, electric means for actuating said bodies; key-controlled circuit-closing devices for bringing said electric means into action; a coupler for connecting the actuating means of a plurality of said sonorous bodies; dampers for said bodies; and electrical means for simultaneously retracting the dampers of the bodies whose actuating devices are coupled, the actuating devices of the sonorous bodies and of the damper-retracting means being under control of a single key of said circuit-closing devices.

10. The combination with a series of sonorous bodies, means for their actuation, and dampers for said bodies, of coupling means causing several sonorous bodies to respond to the actuation of a single one, means for withdrawing the dampers from the bodies whose actuating means are coupled, and means for absorbing the shock incident to release and fall of the damper-withdrawing device.

11. In a musical instrument, the combination of a series of sonorous bodies; means for their actuation; a coupler for connecting the actuating means of a plurality of said bodies; dampers for said bodies; keys controlling the means for actuating said bodies; and means whereby the operation of one key effects the vibration of a plurality of said bodies and the withdrawal of the dampers of said several bodies.

12. In a musical instrument, the combination of a series of tuned sonorous bodies; means for effecting vibration thereof; means for coupling the vibration-effecting means of a plurality of said bodies; dampers for said bodies; means common to a plurality of dampers for simultaneously retracting them; and a shock absorber connected with the retracting means and serving to absorb the shock and retard the fall of the retractor and coupled dampers.

13. In combination with a series of sonorous bodies; electric means for causing their vibration; dampers applied to said bodies; retracting mechanism common to dampers of a plurality of bodies in predetermined musical relation; electric means for actuating said damper-retracting mechanism; and a key provided with two circuit closers, one controlling delivery of current to the electric vibration-producing devices, and the other controlling delivery of current to the electric damper-retracting mechanism, the last-mentioned circuit closer being arranged to complete its circuit in advance of completion of that of the vibration-producing devices.

14. In a musical instrument, the combination of a series of sonorous bodies, means for their actuation, dampers for said bodies, an electromagnet for each set of said bodies of like note name, an armature for each magnet, a rockshaft for each armature and connected thereto in a manner to be turned by the movement thereof, and a plurality of fingers projecting from each rock-shaft into operative engagement with the dampers of all the sonorous bodies of like note name.

15. In a musical instrument, the combination of a series of sonorous bodies, means for their actuation, dampers for said bodies, rockshafts having fingers projecting into operative engagement with said dampers, elbows projecting from said rock-shafts, electromagnets each having pole pieces and an armature rotative between said pole-pieces, a crank-pin projecting from each armature, and a link between each crank-pin and elbow.

16. In a musical instrument, the combination of a series of sonorous bodies; means for causing vibration thereof; dampers for said bodies; couplers, each serving to connect dampers of bodies of like note-name; electromagnets, one for each damper-coupler for actuating the same to retract the connected dampers; a note-coupler; and a series of keys each bringing into action the vibration-producing means of its associated sonorous body and the vibration-producing means coupled therewith, and also bringing into action the electromagnet controlling the damper-retracting devices of the bodies whose vibration-producing means are coupled.

17. In a musical instrument, the combination of a series of sonorous bodies, electric means for their actuation, keys controlling said means, electromagnets equal in number to the notes in an octave, electric circuits for said magnets, circuit-closing devices for said circuits controlled by said keys, dampers for the sonorous bodies controlled by said magnets, and means for coupling the actuating magnets and damper magnets of a plurality of bodies of like note-name.

18. In a musical instrument, the combination of a series of sonorous bodies, electric means for their actuation, a rheostat board introducing resistances into the circuits of said electric means, keys, brushes moved by said keys upon said rheostat board and composing parts of said circuits, a pair of normally open contacts for each key, one contact of each pair being coupled to the corresponding contacts an octave away, and the other contact of each pair being in circuit with a common return-wire, electromagnets in circuit with a source of electricity and said contacts, each magnet being in circuit with contacts controlled by keys of like note-name alone, and dampers for said sonorous bodies withdrawn by said magnets each magnet controlling the dampers of bodies of like note name.

19. In a musical instrument, the combination with sonorous bodies, dampers therefor, and damper lifting means, of a shock-absorber for the same comprising an intermediately pivoted lever weighted at its longer end, and positioned to be struck upon its shorter end by the lifting means when the latter drops, and pads located at the extreme of said weighted end's movements.

20. In a musical instrument, the combination with sonorous bodies, dampers therefor, and means simultaneously lifting a plurality of said dampers, of a shock-absorber for said damper and means comprising an intermediately pivoted lever, a weight adjustable upon the longer end of said lever, a padded lug projecting from said damper operating means into engagement with the shorter end of said lever, and pads located at the extremes of said weight's swing.

21. A musical instrument having sonorous bodies and dampers therefor, electromagnets for the vibration of said bodies, means for delivering correctly-timed electrical impulses to said electromagnets, a keyboard having keys for bringing said means into effect, means operative at will by the player whereby the depression of a single key of the keyboard actuates a plurality of said electromagnets associated with sonorous bodies bearing predetermined musical relation to each other, and means for simultaneously undamping the said sonorous bodies.

22. In a musical instrument, the combination of a series of sonorous bodies; electromagnets for effecting vibration of said bodies; means for delivering correctly timed impulses to said magnets; a keyboard; a brush located in the path of each key and adapted to be moved thereby to complete the circuit of the actuating electromagnet of the sonorous body to which such key belongs; and a second set of brushes, one arranged to be moved into circuit with the actuating brush of the first set, and the other brushes of the second set electrically connected with the first-mention brush of said set, and adapted to be moved simultaneously therewith and thereby carried into circuit with the electromagnets of sonorous bodies bearing predetermined musical relation to the body whose magnet is brought into circuit by the first-mentioned brush of such second set; whereby depression of a single key is caused to energize the electromagnets of a plurality of sonorous bodies in predetermined musical relation with one another.

23. A musical instrument having sonorous bodies electromagnetically actuated, a key and electrical contacts associated with and operated by said key and adapted upon its depression to complete an electrical circuit to the electromagnet actuating the sonorous body normally associated with it, means operative at will by the player for causing said key when depressed to establish extra electrical connection with magnets actuating sonorous bodies in predetermined musical relation with the sonorous body normally associated with the said key, and means for automatically raising the dampers of all said sonorous bodies simultaneously sounding.

24. A musical instrument having tuned sonorous bodies; electromagnetic means for vibrating the same; dampers, one for each such body; and a damper-coupler under control of the player, serving upon the depression of a single key to retract the dampers of a plurality of sonorous bodies in predetermined musical relation with each other.

25. A musical instrument having sonorous bodies and movable dampers therefor, electromagnets for the vibration of said bodies, means for delivering correctly timed electrical impulses to said magnets, a keyboard having keys for bringing said means into effect, and means operative at will by the player whereby the depression of keys automatically causes retraction of the dampers of sonorous bodies other than those normally associated with them.

26. In a musical instrument, the combination of a series of sonorous bodies; electromagnetic means for vibrating said bodies; dampers applied to said bodies; rising and falling means for retracting said dampers; and means for arresting the descent and absorbing the shock incident to the fall of said damper-retracting means.

27. A musical instrument having a plurality of sets of sonorous bodies, electromagnets for the vibration of said bodies, means for delivering correctly timed electrical impulses to said electromagnets, a keyboard having keys for bringing said means into effect, means operative at will by the player for coupling together upon the depression of a single key of said keyboard the vibration-producing magnets of sonorous bodies of one of said sets sustaining predetermined musical relations to each other, and means operating at will by the player for simultaneously causing the coupling of the corresponding vibration-producing magnets of another of said sets of sonorous bodies.

28. A musical instrument having two sets of sonorous bodies, electromagnets for vibrating said bodies, means for delivering correctly timed electrical impulses to said magnets, a keyboard having keys for bringing said means into effect, means operative at the will of the player for coupling together upon the depression of a single key the vibration-producing magnets of sonorous bodies of one of said sets sustaining predetermined musical relations to each other, and means operative at the will of the player for simultaneously causing the coupling of the corresponding magnets of another of said set of sonorous bodies.

29. A musical instrument having a plurality of sets of tuned sonorous bodies, electromagnets for the vibration of said bodies, means for delivering correctly timed electrical impulses to said magnets, a keyboard having keys for bringing said means into effect, means operative at will by the player and affecting a considerable portion of said keyboard, for causing each key upon its depression to sound in one of said sets of sonorous bodies not only the note normally associated with it, but also the note an octave higher and the note an octave lower in pitch, and means operative at will by the player for simultaneously coupling the corresponding magnets in another of said sets of sonorous bodies.

30. A musical instrument having a plurality of sets of tuned sonorous bodies and dampers therefor, electromagnets for the vibration of said bodies, means for delivering correctly timed electrical impulses to said electromagnets, a keyboard having keys for bringing said pulsation-producing means into effect, means operative at will by the player whereby the pressure of a single key of the keyboard actuates a plurality of said electromagnets associated with sonorous bodies bearing musical relations to each other in one of said sets, means for simultaneously undamping the said sonorous bodies, means under the control of the player for simultaneously coupling the corresponding electromagnets of sonorous bodies of another of said sets, and means for simultaneously undamping the last-named sonorous bodies.

31. In a musical instrument, the combination of a series of sonorous bodies, electromagnets for their actuation, means for delivering pulsatory currents to said electromagnets, keys controlling said currents, a support having contacts each wired to a plurality of said electromagnets, brushes movable into touch with said contacts and connected with said pulsatory means, and means operated by said keys to switch the currents through said contacts on their way to said electromagnets.

32. In a musical instrument, the combination of a series of tuned sonorous bodies; electromagnets for their actuation; means including circuits, for delivering pulsatory currents to said electromagnets; keys controlling said currents; a support having contacts included in the circuits of electromagnets of sonorous bodies tuned in octave relation; brushes coöperating with said contacts, each movable by one of said keys into position to complete the circuit of the magnet of the sonorous body to which such key belongs; and means whereby the operation of any such key, in addition to closing its own magnet circuit, shall switch into circuit the electromagnet of a sonorous body in octave relation to that belonging to the key actuated.

33. In a musical instrument, the combination of tuned sonorous bodies; electromagnets for their actuation; a source of electric current; means included in circuit with said source of current for producing correctly timed electrical pulsations in the respective electromagnets; an action rail having contacts respectively wired to the several electromagnets; brushes wired to the current source; keys serving to move said brushes into touch with the respective contacts of said action rail; coupler contacts each wired to a plurality of the first-named contacts; and brushes wired to the current source and each adapted to be put into touch with a coupler contact by the action of one of said keys.

34. A musical instrument comprising in combination a series of tuned sonorous bodies; electromagnets for actuating said bodies; a source of current; circuits connecting said electromagnets with said source; contacts included in said circuits; brushes movable into touch with said contacts; levers carrying said brushes and each provided with a pendent strut; keys controlling the respective electromagnets; and means interposed between the keys and the pendent struts for transmitting motion from the keys to the brushes, said brushes being coupled to cause the simultaneous completion of the circuits of a plurality of magnets actuating sonorous bodies bearing predetermined musical relation to one another.

35. A musical instrument comprising in combination, a series of tuned sonorous bodies; electromagnets for actuating said bodies; a source of current; circuits connecting said electromagnets with said source; contacts included in said circuits; levers pivoted between their extremities, each carrying at one end a brush and at the opposite end a pendent strut; levers lying below the respective pendent struts, and each provided with a seat or saddle for the strut above it; means under control of the performer for throwing said struts out of said saddles; keys corresponding to the respective sonorous bodies, lying beneath the respective saddle-levers, and serving when depressed to move the brushes into touch with the contacts, said brushes being coupled to cause the simultaneous completion of the circuits of a plurality of magnets actuating sonorous bodies bearing predetermined musical relation to one another.

36. A musical instrument comprising in combination, a series of tuned sonorous bodies; electromagnets for actuating said bodies; a source of current; circuits connecting said electromagnets with said source; contacts included in said circuits; levers pivoted between their extremities, each carrying at one end a brush and at the opposite end a pendent strut; levers lying below the respective pendent struts and each provided with a seat or saddle for the strut above it; springs normally holding the struts in said seats; a rocking bar under the control of the performer for throwing said struts out of said saddles; keys corresponding to the respective tuned bodies, lying beneath the respective saddle-levers, and serving when depressed to move the brushes into touch with the contacts, said brushes being-coupled to cause the simultaneous completion of the circuits of a plurality of magnets actuating tuned bodies bearing predetermined musical relation to one another.

37. A musical instrument comprising two electrically operated duplicate sets of sonorous bodies, electromagnets for each set, means embracing circuits for delivering electric pulsations thereto, keys for each of the sonorous bodies of one of said sets, two brushes actuated by each key, a contact for each brush, a circuit-connection between one contact and an electromagnet of one set, a circuit connection between the other contact and a corresponding electromagnet of the other set, a pair of leaf-contacts connected with the respective circuit connections of two corresponding electromagnets, a bridging block for said pair of leaf contacts, means for moving said leaf contacts out of touch with said bridge block, a note coupler, and a brush forming part of said coupler and movable into circuit-completing relation with one of the first-named contacts.

38. In combination with a series of tuned sonorous bodies, dampers therefor; a rockshaft connected with dampers of sonorous bodies of like note-name; and means for rocking said shaft whereby the dampers are simultaneously withdrawn from a plurality of sonorous bodies of like note-name.

39. In combination with a series of tuned sonorous bodies, dampers therefor; a rockshaft connected with dampers of sonorous bodies of like note-name; and electromagnetic means for rocking said shaft whereby the dampers are simultaneously withdrawn from a plurality of sonorous bodies of like note-name.

40. In combination with a series of tuned sonorous bodies, key-controlled electromagnets for causing vibration thereof; dampers for said bodies; a rockshaft connected with and serving to retract dampers of sonorous bodies bearing predetermined musical relation to one another; and a note-coupler serving to couple the magnets of sonorous bodies of predetermined musical relation, whereby upon the actuation of a given controlling key the coupled magnets are caused to vibrate the sonorous bodies with which respectively they are immediately associated.

In testimony that we claim the foregoing invention, we have hereunto set our hands this 17th day of December, 1912.

MELVIN L. SEVERY.
GEORGE B. SINCLAIR.

Witnesses:
EDWARD S. CROCKETT,
ESTHER R. PRUSSIAN.